United States Patent Office.

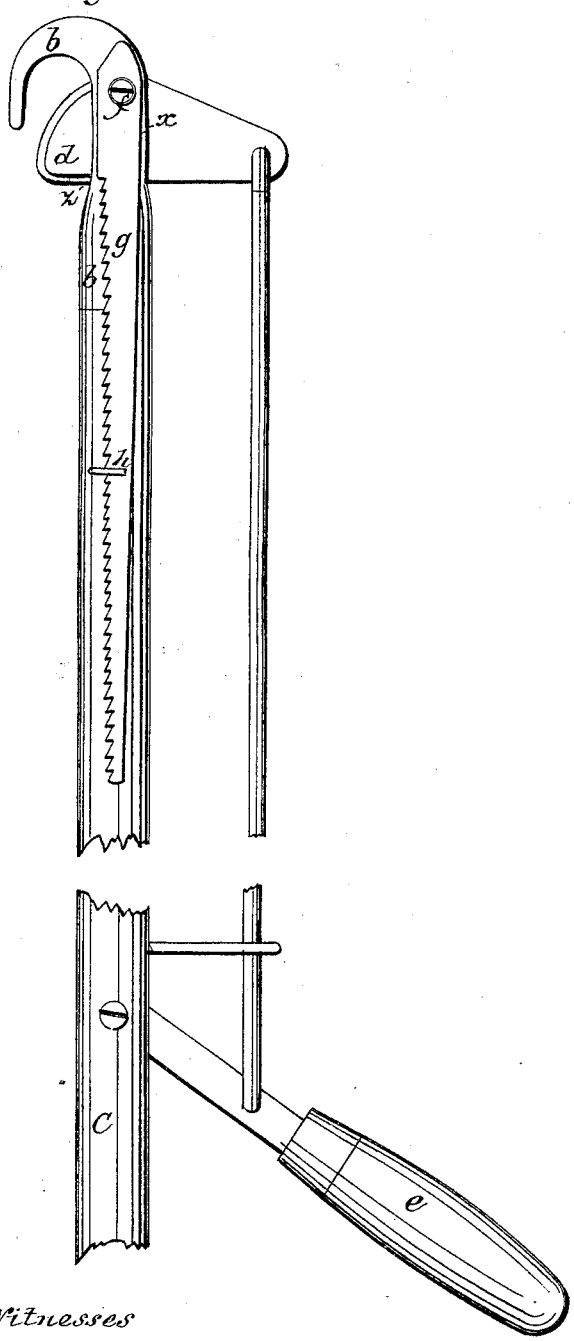

GEORGE F. WATERS, OF BOSTON, MASSACHUSETTS.

Letters Patent No. 90,618, dated May 25, 1869.

---

IMPROVEMENT IN PRUNING-IMPLEMENT.

---

The Schedule referred to in these Letters Patent and making part of the same.

---

*To all whom it may concern:*

Be it known that I, GEORGE F. WATERS, of Boston, in the county of Suffolk, and State of Massachusetts, have invented an Improvement in Pruning-Implements; and I do hereby declare that the following, taken in connection with the drawings which accompany and form part of this specification, is a description of my invention, sufficient to enable those skilled in the art to practise it.

Letters Patent No. 58,326 were granted to me, September 25, 1866, for an improvement in pruning-instruments, in which I made use of an eccentric cutter, formed on or as the short arm of a lever, to be forced toward and into a slotted hooked jaw; and My present invention consists in the combination with said implement of a saw, so pivoted to the fulcrum of the cutter, that it may be extended above the hook with which the cutter works, when it is desired to make use of the saw, or so that it may be turned downward on the shank of the implement when not in use.

The drawings show, in—

Figure 1, my patented pruning-instrument, with a saw added thereunto, in the position in which it is placed when ready for use; and Figure 2 shows the same, with the saw turned down upon the shank, out of the way, and protected by the shank.

In the drawing—

$a$ represents a casting, formed at one end with a socket to fit upon a pole, or handle, $c$, of any desired length, the other end of the casting being formed as a hook, $b$, slotted, or formed with two jaws, or sides parallel to each other, and located at a little distance apart, the eccentric cutter $d$ being pivoted to and between said parts or jaws of the hook, and arranged so as to be operated by the link, or rod which connects the cutter to the hand-lever $e$.

On the screw-pivot $f$ of the cutter, and located between the two yielding, or dishing spring-washers, one on either side, is placed the saw $g$, with its but-end so shaped, that when the saw is made to assume the position seen in fig. 1, said end will catch and hold against a shoulder formed on the casting $a\ b$, at the line $x\ x$, said shoulder being so located and arranged, with respect to the saw-teeth, that pressure on the saw, exerted in the act of sawing, will bring the but-end of the saw closely into contact with the shoulder on the casting, so as to maintain the saw in line with the handle $e$.

When the saw is not needed for use, it is turned down along the length of the handle $e$, and is caught and secured under the hook $h$, which is inserted in the handle for that purpose, as seen in fig. 2.

It will readily be seen that the saw can be easily detached from its pivot, when it is necessary to file the teeth, and that the weight of the implement is increased only by the weight of the saw-blade and the washers around its pivot.

Also, that the position of the saw, in line with the handle $e$, is the most effective for the efficient use of the saw, and the one in which the saw is least liable to be injured by side strains or twists.

The saw, being at the extreme end of the implement, may be worked without hooking branches and twigs, which would be done if the same was located below the hook $b$.

I claim the combination of a saw with a pruning-instrument, substantially as shown and described, so that the saw may be brought into operative action or confined point downward upon the handle, without interfering with the position or action of the cutter.

GEO. F. WATERS.

Witnesses:
 J. B. CROSBY,
 FRANCIS GOULD.